United States Patent
Golden

(10) Patent No.: US 11,649,600 B2
(45) Date of Patent: May 16, 2023

(54) DOCK STABILIZING PILE GUIDE

(71) Applicant: William Golden, North Fort Myers, FL (US)

(72) Inventor: William Golden, North Fort Myers, FL (US)

(*) Notice: Subject to any disclaimer, the term of this patent is extended or adjusted under 35 U.S.C. 154(b) by 84 days.

(21) Appl. No.: 17/336,623

(22) Filed: Jun. 2, 2021

(65) Prior Publication Data

US 2021/0381184 A1 Dec. 9, 2021

Related U.S. Application Data

(60) Provisional application No. 63/035,361, filed on Jun. 5, 2020.

(51) Int. Cl.
| | | |
|---|---|---|
| *E02B 3/06* | (2006.01) | |
| *B63C 1/02* | (2006.01) | |
| *F16M 13/02* | (2006.01) | |
| *B63B 39/00* | (2006.01) | |
| *B63B 35/00* | (2020.01) | |

(52) U.S. Cl.
CPC ............. *E02B 3/064* (2013.01); *B63B 35/00* (2013.01); *B63B 39/00* (2013.01); *B63C 1/02* (2013.01); *F16M 13/022* (2013.01)

(58) Field of Classification Search
CPC ......... E02B 3/064; E02B 3/068; E01D 15/14; B63C 1/02; B63B 35/34
USPC ....................................... 405/218, 219, 221
See application file for complete search history.

(56) References Cited

U.S. PATENT DOCUMENTS

| | | | | |
|---|---|---|---|---|
| 4,043,287 A | * | 8/1977 | Shorter, Jr. | E02B 3/064 |
| | | | | 114/266 |
| 6,230,644 B1 | * | 5/2001 | Passen | B63B 3/06 |
| | | | | 114/263 |
| 8,166,901 B2 | * | 5/2012 | Gerst | B63B 35/38 |
| | | | | 114/220 |
| 8,402,908 B2 | * | 3/2013 | Gerst | B63B 35/38 |
| | | | | 114/263 |
| 8,926,223 B1 | * | 1/2015 | DeStefano | E02D 27/32 |
| | | | | 405/196 |
| 9,487,925 B1 | * | 11/2016 | Meriwether | E02B 3/064 |
| 10,393,202 B2 | * | 8/2019 | Nail | E02B 3/28 |
| 2004/0159273 A1 | * | 8/2004 | Rogerson | B63B 21/50 |
| | | | | 114/230.1 |
| 2011/0274502 A1 | * | 11/2011 | Tibedo | E02B 3/064 |
| | | | | 405/213 |
| 2014/0326171 A1 | * | 11/2014 | Gutierrez | B63B 35/00 |
| | | | | 114/263 |
| 2018/0156290 A1 | * | 6/2018 | Nail | E02B 17/003 |

FOREIGN PATENT DOCUMENTS

| | | | | |
|---|---|---|---|---|
| ES | 2618366 A1 | * | 6/2017 | |
| KR | 20110016670 A | * | 2/2011 | |
| KR | 101311221 B1 | * | 9/2013 | |
| KR | 101312209 B1 | * | 9/2013 | |
| KR | 102167255 B1 | * | 10/2020 | |

\* cited by examiner

*Primary Examiner* — Frederick L Lagman
(74) *Attorney, Agent, or Firm* — William E. Noonan

(57) ABSTRACT

A dock stabilizing pile guide device includes a frame attached to a floating dock and enclosing a respective piling. The frame carries a plurality of rollers that rotatably interengage the piling and guide the dock upwardly and downwardly along the piling as the depth of the underlying water changes.

19 Claims, 4 Drawing Sheets

DOCK STABILIZING PILE GUIDE

RELATED APPLICATION

This application claims the benefit of U.S. Provisional Application Ser. No. 63/035,361 filed Jun. 5, 2020.

FIELD OF THE INVENTION

This invention relates to a device for operably mounting a floating dock to a piling and, more particularly, to a device that stabilizes the dock and guides movement of the dock along the piling.

BACKGROUND OF THE INVENTION

A floating dock usually must be supported by one or more adjacent pilings in a manner that allows the dock to move freely up and down along the pilings as the depth of the underlying water changes. Conventional support systems for floating docks have exhibited a number of problems. In most cases, the dock is mounted to each pile by a metal or plastic bracket, ring or sleeve. Such structures tend to be notoriously weak and subject to breakage and failure. This is compounded by the fact that many floating docks tend to be quite top heavy. A number of these structures employ heavy brick or concrete pavers. Floating docks also tend to be relatively narrow. As a result, when such structures are supported by traditional mounting systems, they can be quite unstable. Heavy and/or unevenly, balanced loads and/or rough water conditions can cause the dock to suddenly flip which can be dangerous and damaging to both the dock itself and persons walking on the dock. At a minimum, uprighting, repairing and reinstalling the dock is usually messy, time consuming, inconvenient, difficult and costly, especially if expensive components such as concrete pavers are lost or damaged and have to be replaced.

SUMMARY OF THE INVENTION

It is therefore an object of the present invention to provide a device that more stably and securely mounts a floating dock to one or more pilings and which enables, the dock to better support heavy and/or unbalanced loads while reliably guiding the dock up and down as it moves up and down along each piling.

It is a further object of this invention to provide a dock stabilizing pile guide that resists breakage and failure much better than existing dock mounting devices.

It is a further object of this invention to provide a dock stabilizing pile guide that significantly reduces the risk that a floating dock will tip or flip over when subjected to heavy or unbalanced loads or rough underlying water conditions.

It is a further object of this invention to provide a device that both effectively stabilizes a floating dock in a body of water and reliably guides the dock to move freely up and down along a respective pile as the depth of the water changes.

It is a further object of this invention to provide a pile guide that is much less apt to fail than existing dock mounting systems and which reduces the risk of personal injury and property damage as well as the mess, inconvenience, and costly repairs caused by such failure.

This invention relates to a dock stabilizing pile guide for operatively mounting a floating dock to a piling. The device includes a frame that is attached to the floating dock and surrounds the piling. The frame carries a plurality of guide rollers for interengaging the piling at a plurality of radial angular orientations about the piling. As the level of the water underlying the floating dock rises or drops, the guide rollers rotatably interengage the piling to guide the frame and attached floating dock along the piling.

In a preferred embodiment, the frame includes generally parallel base and upper frame portions surrounding the piling and a plurality of elongate frame elements that interconnect the base and upper frame portions. Each of the base and upper frame portions carries at least one guide roller for rotatably engaging the circumference of the piling. The frame may support at least one generally vertically aligned pair of rollers, each such pair including an upper roller attached to the upper frame portion and a lower roller attached to the base frame portion. The upper roller may be supported above the upper frame portion and the lower roller may depend from the base frame portion. In other versions, the upper roller may depend from the upper frame portion and the lower roller may be supported above the base frame portion. At least one of the base and upper frame portions may include a respective opposing pair of generally horizontally aligned guide rollers oriented generally perpendicularly to each vertically aligned pair of guide rollers.

Each of the base and the upper frame portions may include a respective, generally parallel pair of horizontal inner and outer beams. Each inner beam is interconnected to an outer beam by a respective pair of side beams. A non-perpendicularly angled corner piece may join each side beam to a respective inner beam. As a result, the base and upper frame portions respectively define aligned lower and upper frame openings through which a respective piling extends. Each guide roller may be mounted on a respective inner, outer or side beam. A first pair of the vertically aligned guide rollers may be attached to respective outer beams of the upper and base frame portions. These guide rollers are supported above and below respective outer beams of the upper and base frame portions. A second vertically aligned pair of guide rollers are secured to respective inner beams of the upper and base frame portions. This pair of guide rollers may be respectively supported below and above respective inner beams of the upper and base frame portions. A pair of opposing, horizontally aligned rollers may be attached to respective side beams of the base frame portion.

Four vertical frame elements may be employed. Each vertical frame element may interconnect a respective corner of the base frame portion to a corresponding corner of the upper frame portion. Certain versions feature angled corner pieces. The vertical frame elements that interconnect respective corner pieces between the inner beams and the side beams are angularly configured cross sectionally to generally correspond to the angled face formed between the inner beam element and each adjoining side beam element. Exterior panels may be mounted to the frame to cover the vertical sides of the guide.

One or more mounting straps or brackets may be attached to and depend from respective side beams of the base frame portion. Appropriate fasteners secure the straps to the floating dock, which attaches the frame to the dock. The frame includes an opening that extends fully through the frame from the top to the bottom of the frame for receiving a respective piling.

BRIEF DESCRIPTION OF THE DRAWINGS

Other objects, features and advantages will occur from the following description of a preferred embodiment and the accompanying drawings, in which.

DETAILED DESCRIPTION OF PREFERRED EMBODIMENTS

Figure 1:
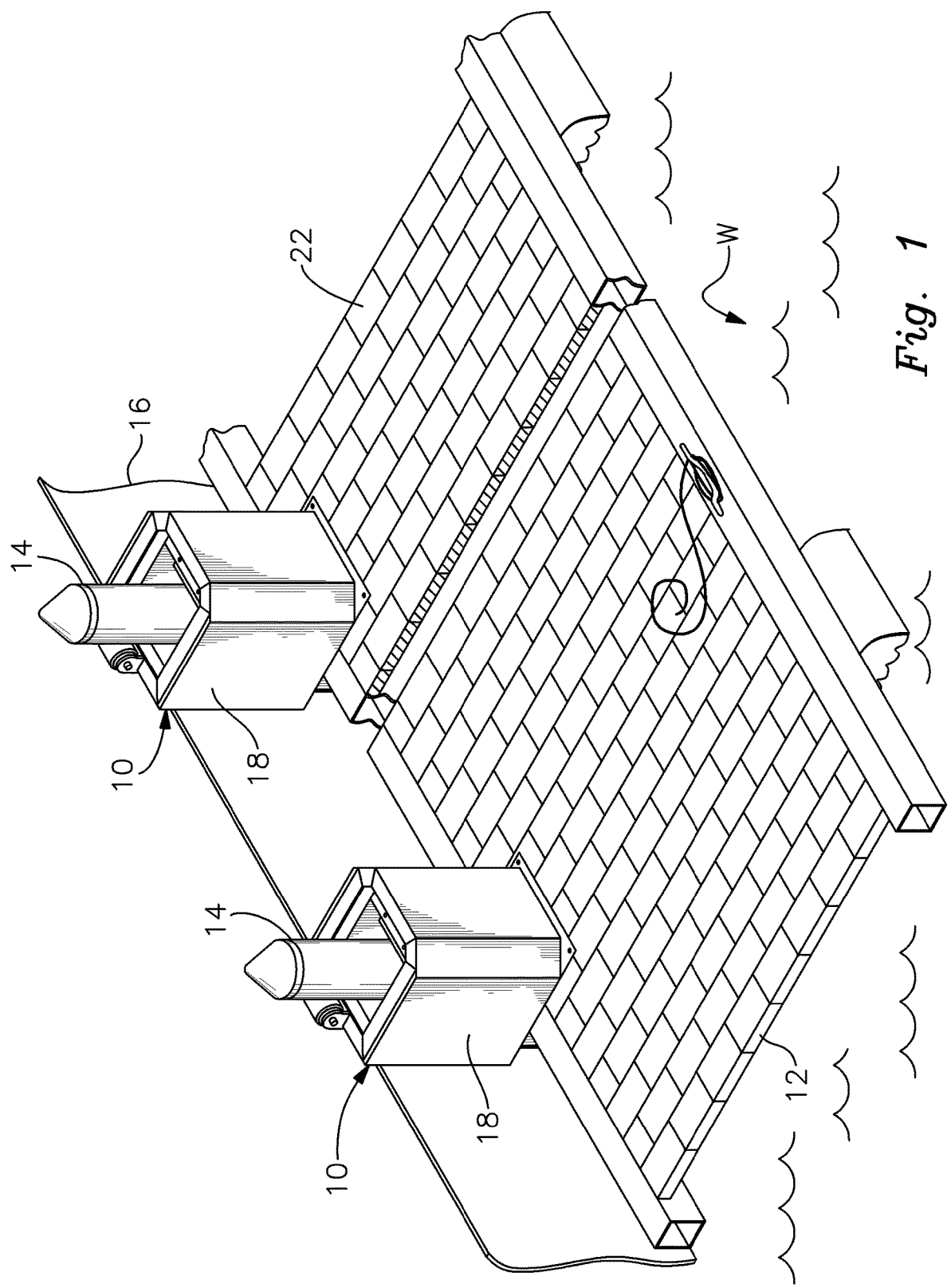
FIG. 1 is a side perspective view of a floating dock that is mounted to a plurality of adjoining pilings by respective dock stabilizing pile guides in accordance with this invention.

There is shown in FIG. 1 a dock stabilizing pile guide 10 for movably mounting a floating dock 12 to one or more adjoining piles or pilings 14. More particularly, in the version shown herein, floating dock 12 is mounted to a plurality of adjoining pilings 14, which are themselves respectively positioned along a waterside pier 16. Each pile guide 10 is operatively interengaged with a respective piling 14 in a manner described more fully below, which enables the guide to move up and down along piling 14 as the water level changes. The guide in the foreground includes a plurality of exterior panels 18 that are supported by the underlying frame of the guide, which frame is described more fully below. An analogous guide 10a is likewise operatively interengaged with the next distally adjoining piling 14. The exterior frame panels are omitted from guide 10a to reveal the underlying frame 20 of the guide. Each successive piling 14 between pier 16 and dock 12 is also operatively interengaged by a respective pile guide 10 as described herein.

Figure 2:
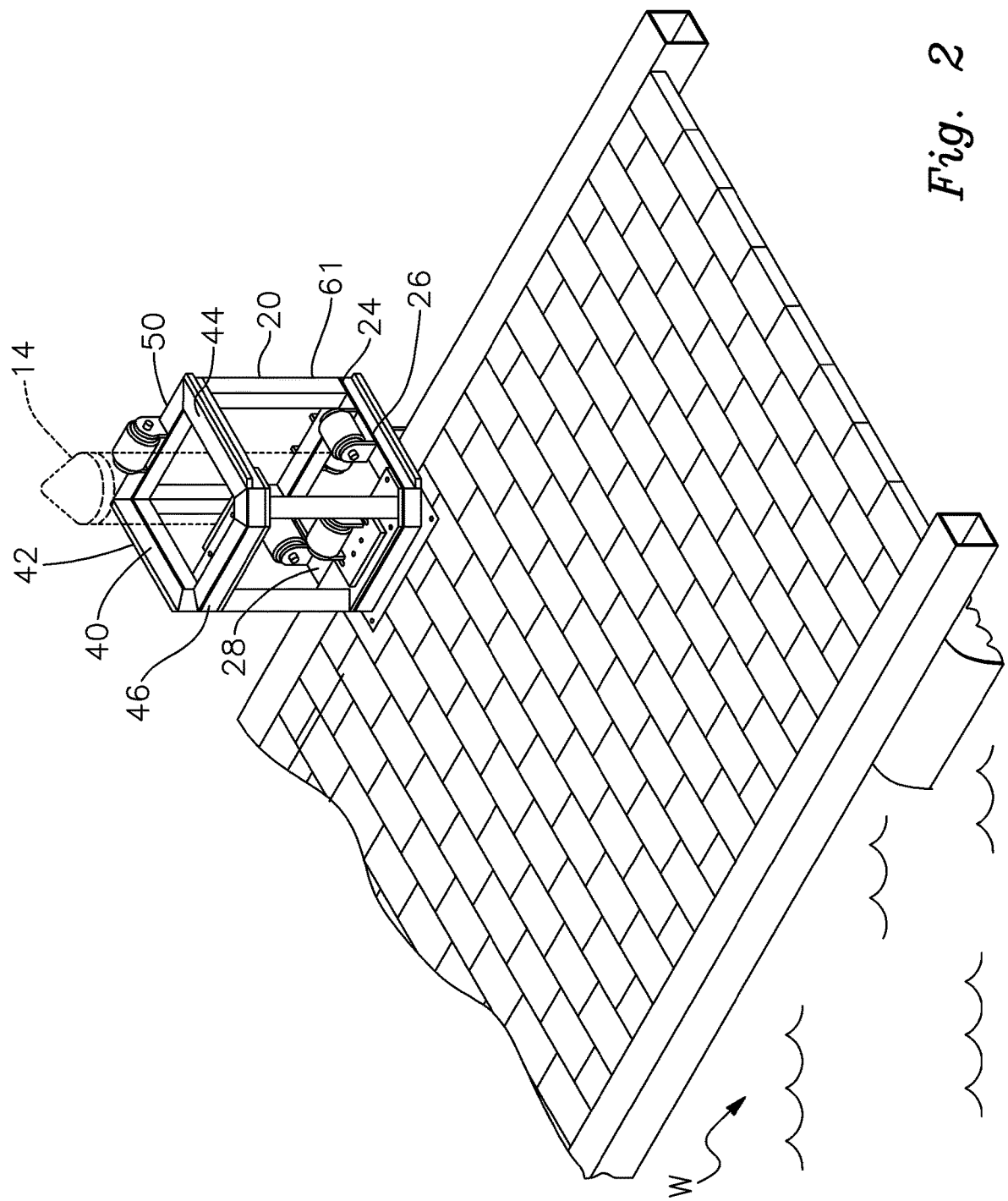
FIG. 2 is an perspective view depicting a representative pile guides mounted to the floating dock and operatively engaged with a respective piling; the exterior panels carried by the frame of the guide are removed to more clearly depict the rollers of the pile guide.

Floating dock 12 includes an elongate and typically a relatively narrow configuration. The floating dock may be constructed in a manner analogously to conventional floating docks. The construction of such docks will be known to persons skilled in the art. In the version shown in FIGS. 1 and 2, dock 12 includes a walkway comprising concrete pavers 22. It should be understood that the construction and configuration of the floating dock itself do not constitute limitations and may be varied within the scope of this invention.

Each pile guide 10 is secured to floating dock 12 in the manner described below. By the same token, each guide movably interengages a respective piling 14 to guide attached dock 12 upwardly and downwardly along the pilings 14 as the depth of the underlying water W rises and drops respectively. Guides 10 stabilize the dock and prevent it from disengaging the pilings and potentially tipping or flipping over.

Figure 3:
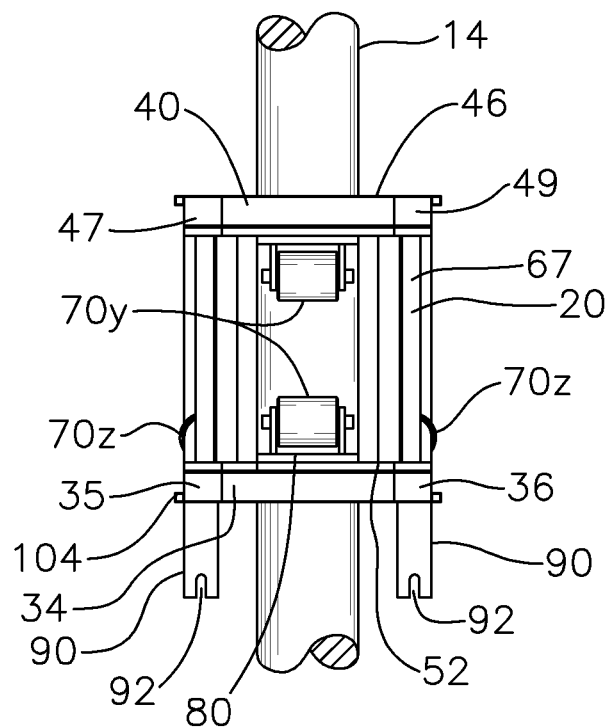
FIG. 3 is an elevational front view of the pile guide as engaged with a respective piling and with the frame panels omitted.
Figure 4:
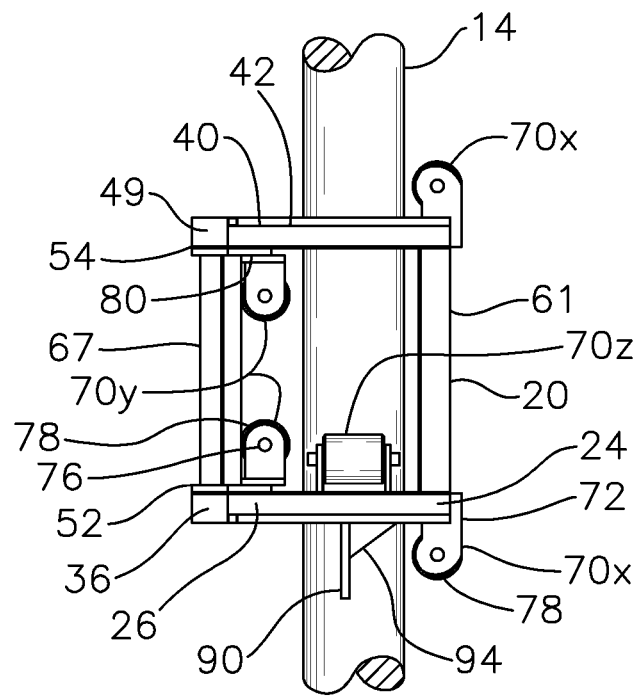
FIG. 4 is an elevational side view of the pile guide operatively engaged with a respective piling and with the frame panels omitted.
Figure 5:
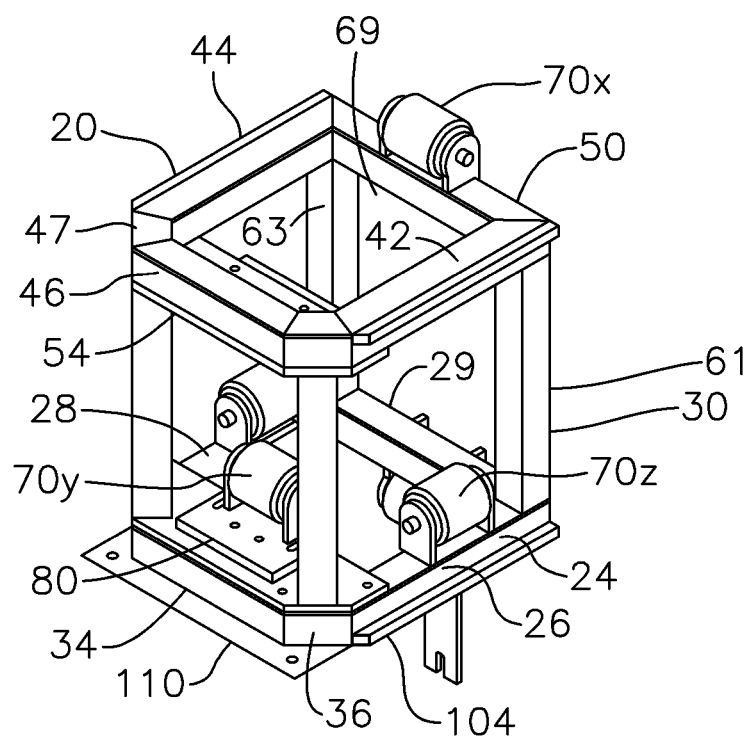
FIG. 5 is a perspective view of the pile guide by itself and with the exterior frame panels omitted to depict the guide rollers.

Each guide includes representative frame 20 as shown in FIGS. 2-5. Frame 20 comprises a generally rectangular framework composed of aluminum or other durable metallic or synthetic materials suited for a marine environment. The frame includes a base portion 24 featuring a parallel pair of horizontal side beams 26 and 28. The forward or inner ends of beams 26 and 28 are interconnected by a transverse inner beam 34 and a pair of angled inner corner pieces 35 and 36. The opposite ends of beams 26 and 28 are interconnected by a transverse outer beam 29 (FIG. 5).

Frame 20 further includes an analogous upper portion 40 featuring a pair of generally parallel horizontal side beams 42 and 44. Respective inner ends of beams 42 and 44 are interconnected to a horizontal beam 46 by respective beveled corner pieces 47 and 49. The opposite outer ends of beams 42 and 44 are perpendicularly connected to an outer rearward horizontal beam 50. A lower support plate 52 is attached to the upper surface of lower frame portion 24 proximate an inner edge of frame 20 by bolts or other appropriate means of attachment. A similar upper support plate 54 is secured to the lower surface of upper frame portion 40 proximate the inner edge of the frame. Four elongate vertical frame elements 61, 63, 65 and 67 interconnect lower and upper frame portions 24 and 40 at, respective corners thereof. Elements 65 and 67 include generally triangular cross sectional configurations and therefore provide angled faces that generally correspond with the angles formed by the outer faces of beveled corner pieces 36, 49 and 35, 47, respectively. Each vertical element 65 and 67 is interconnected between lower plate 52 and upper plate 54 (e.g. by welding). It should be understood that each of the elongate horizontal and vertical beams and elements of frame 20, as well as the corner pieces and plates, comprise aluminum or other durable metallic or synthetic materials capable of withstanding a harsh and corrosive marine environment. The various components may be interconnected by welding and the plates 52, 54 are respectively secured to the base and upper frame portions by bolts or analogous means of fastening. Holes are depicted in plates 52 and 54 for receiving stainless steel hardware. Frame 20 thereby provides a central opening 69 through which a respective piling 14 is received.

Frame 20 carries a set of guide roller assemblies 70x, 70y, 70z as further depicted in FIGS. 2-5. In the version shown herein, six roller assemblies 70x-z are shown. Alternative numbers, constructions and arrangements of rollers may be employed within the scope of this invention. Each roller assembly comprises a pair of spaced apart mounting ears 72, 74 that support an axle, shaft, or pin 76, on which a respective roller 78 is rotatably mounted. 04"×4.25" UHMW rollers may be employed. Other types and dimensions of roller assemblies may be alternatively utilized within the scope of this invention.

The roller assemblies 70x, y, z are preferably arranged as shown in FIGS. 2-5. In particular, a first pair of generally vertically aligned, stabilizing outer roller assemblies 70x, are mounted respectively to lower and upper horizontal beams 29 and 50 of frame 20. Mounting ears 72 are welded or otherwise secured to beams 29 and 50. The ears are oriented such that a lower roller 78 is supported below beam 29 and an aligned upper roller 78 is held above beam 50. Both assemblies 70x project their rollers 78 forwardly to interengage piling 14.

A second vertically aligned pair of inner roller assemblies 70y are mounted on respective plates 52 and 54 of the frame. Each roller assembly 70y is supported on a respective roller fastening plate 80 that is in turn attached to a respective one of the mounting plates 52, 54 of frame 20. Once again, plates 80 are provided with screw holes for receiving bolts or alternative fastening components to attach the roller assemblies to the underlying support plates 52, 54. In these inner roller assemblies, mounting ears 72 are welded to the respective roller fastening plates 80. The inner roller assemblies 70y are supported such that an upper one of those assemblies depends from top frame portion 40 and a vertically aligned lower roller assembly extends upwardly from frame base 24. As best shown in FIGS. 3 and 4, the inner roller assemblies 70y are positioned interiorly within the frame and are vertically aligned with one another.

A third set of opposing side roller assemblies 70z are supported respectively on lower beams 26 and 28 of frame 20. These rollers oppose one another and are generally horizontally aligned.

A pair of dock mounting brackets 90 are attached to and depend from frame base 24. In particular, one of the brackets 90 is fastened to and depends from beam 26 and the other bracket likewise depends from beam 28. Brackets 90 are substantially aligned with one another on respective sides of the frame. Each bracket includes a slot 92 for receiving an appropriate fastener. A strengthening gusset 94 interconnects each bracket 90 with a respective beam of base 24.

Figure 6:
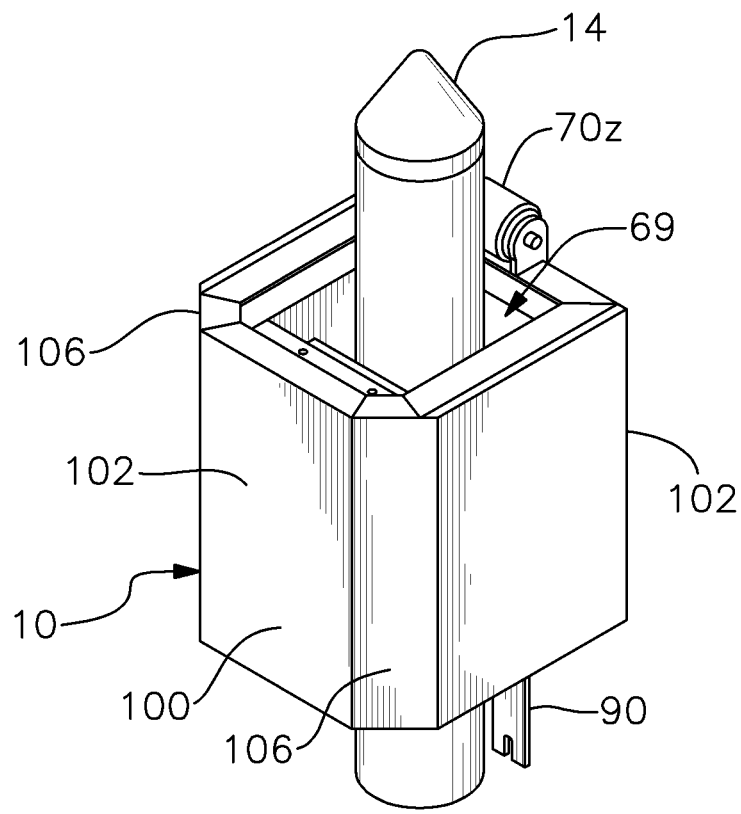
FIG. 6 is a perspective view of the pile guide, as operatively engaged with a respective piling and with the frame panels attached to the frame.

As best shown in FIGS. 1 and 6, frame 20 supports a plurality of exterior panels 100. In particular, each of the four substantially rectangular sides of frame 20 supports a large rectangular panel 102 that is secured to the pieces of the frame by welding, screws or other fastening means. As shown in FIGS. 2-5, lower lips 104 on respective sides of the frame help to support the side panels. Smaller corner panels 106 cover the angled corners of the guide. The panels serve to hide and protect the roller assemblies. They also help to prevent injury to persons using the dock. Logos and other printed material may be applied to the exterior surface of the panels.

Each guide 10 is installed on a respective piling 14. In particular, the guide is raised above the piling and positioned such that the central opening formed from top to bottom through the guide is aligned with the piling 14. Guide 10 is then lowered over the piling such that the piling is received through the central opening 69 of the guide as shown in FIGS. 1-4 and 6. The frame is sized and constructed such that rollers 70x,y,z circumferentially and rotatably interengage the outer surface of the piling. This allows the guide to move freely up and down along the length of the received piling.

Each guide 10 is further mounted to dock 12 in the manner shown in FIG. 1. Specifically, an inner mounting strip or sheet 110, shown in FIGS. 1 and 5, may be provided along the lower inner edge of guide 10 and around the angled corners for engaging an upper surface of floating dock 12. Appropriate fasteners may be inserted through holes in the sheet to fasten the inner end of the guide to the dock. Fasteners are also secured within slots 92 of brackets 90, FIGS. 3-6, such that the guide is securely attached to sides of the dock. Various alternative fasteners may be employed to attach guide 10 securely to docket 12.

With each guide movably mounted onto the piling in the foregoing manner and in turn securely attached to the floating dock, the apparatus can be effectively utilized for both stabilizing the supported dock and reliably guiding upward and downward movement of the guides and attached dock along the adjacent pilings as the water level changes. As the water rises, the floating dock raises the guide. The rollers rotatably interengage the circumference of the respective piling to guide the attached dock reliably along the piling. The arrangement of the roller assemblies is particularly effective for such guidance. The vertically aligned outer rollers 70x extend above and below frame beams 50 and 29 respectively and the inner roller assemblies 70y extend interiorly into the frame 20 of guide 10. This provides for very balanced, secure and stabilizing support and movement of the guides and attached dock on the pilings. The opposing side rollers 70 further add to the stability. The surrounding configuration of rollers about the pilings freely and smoothly guides the attached floating dock to move reliably and stably up and down along the piling as the water level changes.

The roller guide assembly of this invention provides for significant advantages over the prior art. The substantial weight and leverage of the dock is distributed more evenly and effectively along the pilings by the radially, vertically and horizontally dispersed placement of the rollers. As a result, the dock mounting system is far less likely than existing systems to break and fail. By the same token, significantly improved stability is achieved. Unlike the prior art, applicant's system is not apt to tip or flip over when the dock is subjected to an uneven or extreme weight or encounters extremely rough water and/or weather conditions. The damage, inconvenience, repair expenses and potential injuries which can result from the flipping or failure often exhibited by prior systems are thereby largely avoided. A much more reliable, stable and accident-free mounting system for floating docks is achieved.

Although specific features of the invention are shown in some of the drawings and not others, this is for convenience only, as each feature may be combined with any and all of the other features in accordance with this invention.

What is claimed is:

1. A dock stabilizing pile guide for mounting a dock floating in a body of water to a piling, said pile guide comprising:
    a frame attached to the floating dock and surrounding the piling, said frame including generally parallel and horizontally oriented base and upper frame portions, which surround the piling, said frame further including a plurality of elongate, generally vertical frame elements that interconnect said base and upper frame portions, each of said base and upper frame portions including a respective, generally parallel and horizontally oriented pair of inner and outer beams; and
    a plurality of guide rollers axially rotatably mounted to said frame and interengaging the piling at a plurality of respective radial angular orientations about the piling such that as the level of the body of water underlying the dock changes, said guide rollers rotate across the piling to guide said frame and the attached floating dock along the piling; said plurality of guide rollers including a first pair of generally vertically aligned rollers rotatably attached to respective said outer beams of said upper and base frame portions, said first pair of generally vertically aligned guide rollers being supported above and below said outer beams of said upper and base frame portions respectively.

2. The guide of claim 1 in which said guide rollers include an opposing pair of generally horizontally aligned guide rollers carried by at least one of said upper and base frame portions and oriented generally perpendicularly to each said generally vertically aligned pair of guide rollers.

3. The guide of claim 1 in which each said inner beam is interconnected to a respective said outer beam by a corresponding pair of side beams.

4. The guide of claim 3 in which each said beam is joined to a respective said inner beam by a non-perpendicularly angled corner piece, whereby said base and upper frame portions respectively define generally aligned lower and upper frame openings for receiving a respective piling.

5. The guide of claim 3 in which each said guide roller is mounted to a respective one of said inner, outer and side beams.

6. The guide of claim 3 in which said guide rollers include a pair of opposing and generally horizontally aligned guide rollers rotatably attached to respective said side beams of said base frame portion.

7. The guide of claim 3 in which said base frame portion and said upper frame portion include aligned openings that communicate through a central opening of said frame for receiving a respective piling therethrough.

8. The guide of claim 7 in which exterior panels are secured to said inner, outer and side beams and to said vertical frame elements to enclose and define vertical sides of said frame.

9. The guide of claim 1 further including a mounting bracket for securing said frame to the floating dock.

10. A dock stabilizing pile guide for mounting a dock floating in a body of water to a piling, said pile guide comprising:
   a frame attached to the floating dock and surrounding the piling, said frame including generally parallel and horizontally oriented base and upper frame portions, which surround the piling, said frame further including a plurality of elongate, generally vertical frame elements that interconnect said base and upper frame portions, each of said base and upper frame portions including a respective, generally parallel and horizontally oriented pair of inner and outer beams, each said inner beam being interconnected to a respective said outer beam by a corresponding pair of side beams, said base frame portion and said upper frame portion including aligned openings that communicate through a central opening of said frame for receiving a respective piling therethrough;
   a plurality of exterior panels secured to said inner, outer and side beams and to said vertical frame elements to enclose and define vertical sides of said frame; and
   a plurality of guide rollers axially rotatably mounted to said frame and interengaging the piling at a plurality of respective radial angular orientations about the piling such that as the level of the body of water underlying the dock changes, said guide rollers rotate across the piling to guide said frame and the attached floating dock along the piling.

11. The guide of claim 10 in which each of said base and upper frame portions carries at least one said guide roller for rotatably interengaging a peripheral surface of the piling.

12. The guide of claim 11 in which said frame supports at least one generally vertically aligned pair of said guide rollers, each said generally vertically aligned pair of guide rollers including an upper roller rotatably attached to said upper frame portion and a lower roller rotatably attached to said base frame portion.

13. The guide of claim 12 in which said upper roller is supported above said upper frame portion and said lower roller depends from said base frame portion.

14. The guide of claim 12 in which said upper roller depends from said upper frame portion and said lower roller is supported above said base frame portion.

15. The guide of claim 11 in which said plurality of guide rollers include a first pair of generally vertically aligned rollers rotatably attached to respective said outer beams of said upper and base frame portions, said first pair of generally vertically aligned guide rollers being supported above and below said outer beams of said upper and base frame portions respectively.

16. The guide of claim 15 further including a second generally vertically aligned pair of guide rollers rotatably attached to respective said inner beams of said upper and base frame portions, said second pair of said generally vertically aligned guide rollers being supported below and above said inner beams of said upper and base frame portions respectively.

17. The guide of claim 10 in which each of said base and upper frame portions includes a respective, generally parallel and horizontally oriented pair of inner and outer beams.

18. A dock stabilizing pile guide for mounting a dock floating in a body of water to a piling, said pile guide comprising:
   a frame attached to the floating dock and surrounding the piling, said frame including generally parallel and horizontally oriented base and upper frame portions, which surround the piling, said frame further including a plurality of elongate, generally vertical frame elements that interconnect said base and upper frame portions, each of said base and upper frame portions including a respective, generally parallel and horizontally oriented pair of inner and outer beams, each said inner beam being interconnected to a respective said outer beam by a corresponding set of side beams, said base frame portion and said upper frame portion including aligned openings that communicate through a central opening of said frame for receiving a respective piling therethrough; and
   a plurality of guide rollers axially rotatably mounted to said frame and interengaging the piling at a plurality of respective radial angular orientations about the piling such that as the level of the body of water underlying the dock changes, said guide rollers rotate across the piling to guide said frame and the attached floating dock along the piling; said outer beams of said base and upper frame portions respectively carrying a first vertically aligned pair of guide rollers, said inner beams of said base and upper frame portions respectively carrying a second vertically aligned pair of guide rollers, one pair of said first and second pairs of guide rollers being supported above and below said upper and base frame portions respectively.

19. The guide of claim 18 in which the other pair of said first and second vertically aligned pairs of guide rollers are supported below and above said upper and base frame portions respectively.

* * * * *